(12) United States Patent
Szuberski et al.

(10) Patent No.: US 10,197,118 B2
(45) Date of Patent: Feb. 5, 2019

(54) BRAKE CYLINDER

(71) Applicant: WABCO Europe BVBA, Brussels (BE)

(72) Inventors: Oktawian Szuberski, Wroclaw (PL);
Eligiusz Stefaniak, Wroclaw (PL);
Michal Grzeszczuk, Olawa (PL);
Andrzej Lewandowski, Gajkrów (PL)

(73) Assignee: WABCO Europe BVBA, Brussels (BE)

( * ) Notice: Subject to any disclaimer, the term of this patent is extended or adjusted under 35 U.S.C. 154(b) by 43 days.

(21) Appl. No.: 14/900,187

(22) PCT Filed: Jun. 28, 2013

(86) PCT No.: PCT/EP2013/001900
§ 371 (c)(1),
(2) Date: Dec. 21, 2015

(87) PCT Pub. No.: WO2014/206430
PCT Pub. Date: Dec. 31, 2014

(65) Prior Publication Data
US 2016/0146274 A1 May 26, 2016

(51) Int. Cl.
*B60T 17/08* (2006.01)
*F16D 55/224* (2006.01)
(Continued)

(52) U.S. Cl.
CPC ..... *F16D 55/2245* (2013.01); *F16D 65/0006* (2013.01); *F16D 65/28* (2013.01); *F16D 2121/08* (2013.01); *F16D 2125/04* (2013.01)

(58) Field of Classification Search
CPC ........ B60T 17/083; B60T 17/08; B60T 13/38; B60T 17/088; F16D 2121/08; F16D 2121/10; F16D 2121/12; F16D 2125/04
(Continued)

(56) References Cited

U.S. PATENT DOCUMENTS 3,462,986 A * 8/1969 Cox, Jr. ................. B60T 13/22
92/129
3,765,514 A * 10/1973 Harrison ................ B60T 1/062
188/366

(Continued)

FOREIGN PATENT DOCUMENTS

DE 1920559 A1 * 1/1971 ............. B60T 17/08
DE 44 09 351 A1 9/1995
(Continued)

OTHER PUBLICATIONS

European Patent Office, Rijswijk, Netherlands, International Search Report of International Application No. PCT/EP2013/001900, dated Jun. 13, 2014, 3 pages.

*Primary Examiner* — Bradley T King
*Assistant Examiner* — Stephen M Bowes
(74) *Attorney, Agent, or Firm* — Brinks Gilson & Lione

(57) ABSTRACT

A brake cylinder for an air-operated brake, in particular for commercial vehicles, has a housing including a front cover (11), wherein the front cover (11) is provided with a cylindrical lateral surface (16) and with a base wall (18) adjoining the lateral surface (16). The base wall (18) is provided with an elevated portion (19) having a central bore or middle opening (23) for a cylinder plunger. The front cover (11) is provided with a rib (46). The rib (46) extends on the base wall (18) in addition to the elevated portion (19).

8 Claims, 5 Drawing Sheets

(51) Int. Cl.
*F16D 65/00* (2006.01)
*F16D 65/28* (2006.01)
*F16D 121/08* (2012.01)
*F16D 125/04* (2012.01)

(58) Field of Classification Search
USPC .......................................................... 92/161
See application file for complete search history.

(56) References Cited

U.S. PATENT DOCUMENTS

| | | | | |
|---|---|---|---|---|
| 3,896,706 | A * | 7/1975 | Newstead | B60T 17/083 92/108 |
| 5,195,421 | A * | 3/1993 | Shinohara | B60T 13/567 60/547.1 |
| 5,944,150 | A * | 8/1999 | Hikari | B66D 5/14 188/156 |
| 6,318,240 | B1 * | 11/2001 | Plantan | B60T 17/08 92/161 |
| 6,851,761 | B2 * | 2/2005 | Baumgartner | B60T 13/741 188/106 P |
| 2003/0070888 | A1 | 4/2003 | Baumgartner et al. | |
| 2009/0183958 | A1 * | 7/2009 | Sano | B60T 8/00 188/204 R |
| 2013/0327209 | A1 * | 12/2013 | Gaufin | B60T 17/088 92/96 |

FOREIGN PATENT DOCUMENTS

| | | | | |
|---|---|---|---|---|
| DE | 101 63 144 A1 | | 7/2003 | |
| EP | 1122143 A1 | * | 8/2001 | ............. B60T 17/08 |
| FR | 905150 A | * | 11/1945 | ............. B60T 17/08 |
| GB | 1460280 A | * | 12/1976 | ............. B60T 13/38 |

\* cited by examiner

BRAKE CYLINDER

TECHNICAL FIELD

The present invention relates to brake cylinders for air-operated brakes and, in particular to brake cylinders for air-operated disc brakes for commercial vehicles. The invention further relates to air-operated brakes.

BACKGROUND

Pneumatically disc brakes on commercial vehicles are well-known. In a pneumatically disc brake a housing of a brake cylinder is attached to a housing of a brake caliper and applies a brake actuation force through a cylinder plunger to a lever within the caliper. The housing of the brake cylinder is divided at least in two parts, namely front cover and a bottom. Both parts are generally cup-shaped wherein the front cover is attached to the brake caliper.

The front cover has a cylindrical lateral surface and a base wall adjoining the lateral surface, with a circumferential edge as a transition from the lateral surface to the base wall. The latter is provided with an elevated portion having a central bore for the cylinder plunger. Generally, the base wall with the elevated portion is designed symmetrically as could be seen from a top view. The material of the front cover has a thickness due to forces acting on the front cover and resulting from the function of the brake cylinder.

Since braking a wheel nearly always causes vibrations the front cover could be vibrating too due to unfavorable conditions. As a result lifetime of brake cylinder could decrease.

SUMMARY OF THE INVENTION

It is an object of the invention to overcome the foregoing problems and to provide a brake cylinder with a thinner material of front cover and/or with a less vibrating front cover. This object is achieved by providing a brake cylinder with the features of claim 1. The front cover has a rib extending on the base wall and beside the elevated portion. The rib could be placed anywhere on the base wall in addition to the elevated portion and could be directed somewhere. The rib increases vibration resistance of front cover or brake cylinder, durability against vibrations and overall stiffness by shape. Hence the same stiffness as before (without a rib) could be achieved with a reduced thickness of the front cover having a rib.

In one aspect of the invention, the rib extends from the elevated portion in the direction of a circumferential edge between the base wall and the cylindrical lateral surface. Particularly the rib ends at the circumferential edge. An upper surface of the elevated portion can be provided at the same level as an adjoining end of upper surface of the rib. Especially there is no gap or disruption between said upper surfaces. In a further aspect of the invention, the rib extends from the elevated portion in a radial direction, the rib particularly extends perpendicularly to the elevated portion. In a radial and perpendicular alignment the rib is starting from a medium area of the elevated portion. Also possible is a perpendicular alignment without being directed radially.

In a further aspect of the invention, the rib extends in a radial direction and ends at the cylindrical lateral surface or at a circumferential edge between the base wall and the cylindrical lateral surface. In a further aspect of the invention, the rib extends from the elevated portion and inclines down to the base wall, the rib particularly inclines down to an intersection of the base wall with the cylindrical surface. Said intersection can be the circumferential edge. The rib connects the circumferential edge with the elevated portion. The circumferential edge or any other edge of the front cover could be rounded or beveled.

In a further aspect of the invention, the rib is provided with a width smaller than the width of the elevated portion.

Part of the invention is also a pneumatically actuatable brake with a brake cylinder as mentioned before.

Further objects, advantages and novel features of the present invention will become apparent from the following detailed description of the accompanying drawings. The drawings are provided for purely illustrative purposes and are not intended to limit the scope of the invention.

DETAILED DESCRIPTION OF THE DRAWINGS

Figure 1:
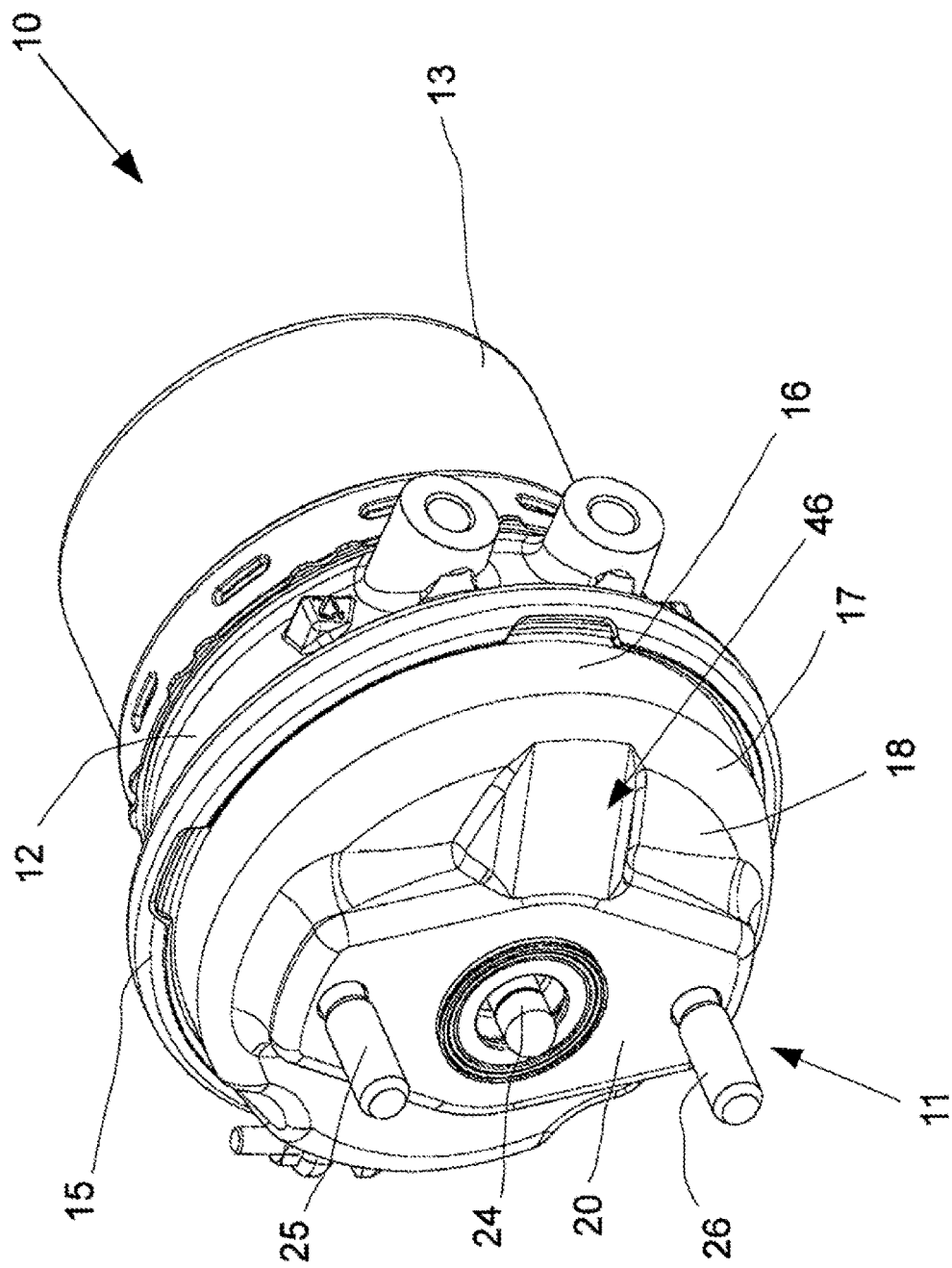
FIG. 1 is a three-dimensional view of an air-operated brake cylinder.

Referring to FIG. 1, there is shown a pneumatically operated brake cylinder 10 as an actuator for disc brakes on commercial vehicles. The brake cylinder 10 has a cup-shaped front cover 11, a cylindrical middle section 12 and a cup-shaped bottom part 13. Front cover 11 has an annular flange 14. The latter is hold on a corresponding flange (not shown) of the middle section 12 by a circumferential retaining clamp 15.

Adjoining the flange 14 a cylindrical lateral surface 16 is provided. Lying opposite to the flange 14 the lateral surface 16 has a beveled or rounded circumferential edge 17 as a transition to a base wall 18, the latter extending substantially perpendicularly to the lateral surface 16. The base wall 18 has an elevated portion 19 having a central wall 20 with two outer openings 21, 22 and one middle opening 23. A plunger 24 is mounted in the brake cylinder 10 for reciprocation within the middle opening 23. Threaded studs or bushings 25, 26 extend through openings 21, 22. The central wall 20 is attached to a brake caliper (not shown) of a disc brake.

The central wall 20 is designed like an isosceles trapezium and its reflection, with the middle opening 23 and obtuse angles 27, 28 crossed by an axis of reflection 29 between the trapeziums. Longitudinal edges 30, 31, 32, 33 are provided between the obtuse angles 27, 28 and transversal edges 34, 35. Angles 36, 37, 38, 39 are provided between the longitudinal edges 30-33 and the transversal edges 34, 35.

Base wall 18 and central wall 20 are parallel to each other. Longitudinal side walls 40, 41, 42, 43 and front walls 44, 45 raise from the base wall 18 up to the central wall 20. Transition from the base wall 18 to the side walls 40-43 and front walls 44, 45 on one hand and from the central wall 20 to the side walls 40-43 and front walls 44, 45 on the other hand are rounded or beveled. A rib 46 is provided on the base wall 18, connecting the central wall 20 with the circumferential edge 17. The rib 46 is directed in the axis of reflection 29 and also radially with respect to the middle opening 23 and is designed like a ramp or wedge with an oblique top side 47, and triangular side walls 48, 49. Transitions to adjoining walls are again beveled or rounded. The top side 47 is an extension of the central wall 20 but oriented obliquely downwards to the circumferential edge 17.

Due to the reinforcing rib 46 the front cover 11 has an increased vibration resistance together with an increased stiffness compared to a front cover without rib. It is further possible to reduce the wall thickness of the front cover 11 together with a reduction of weight and cost.

The front cover 11 including the rib 46 is for example made of metal sheet, aluminum, composite or composite with metal core by deep-drawing or thermoforming. Hence the rib 46 is a three-dimensional portion or section of the front cover 11 and is open on one side as well as the elevated portion 19.

Figure 2:
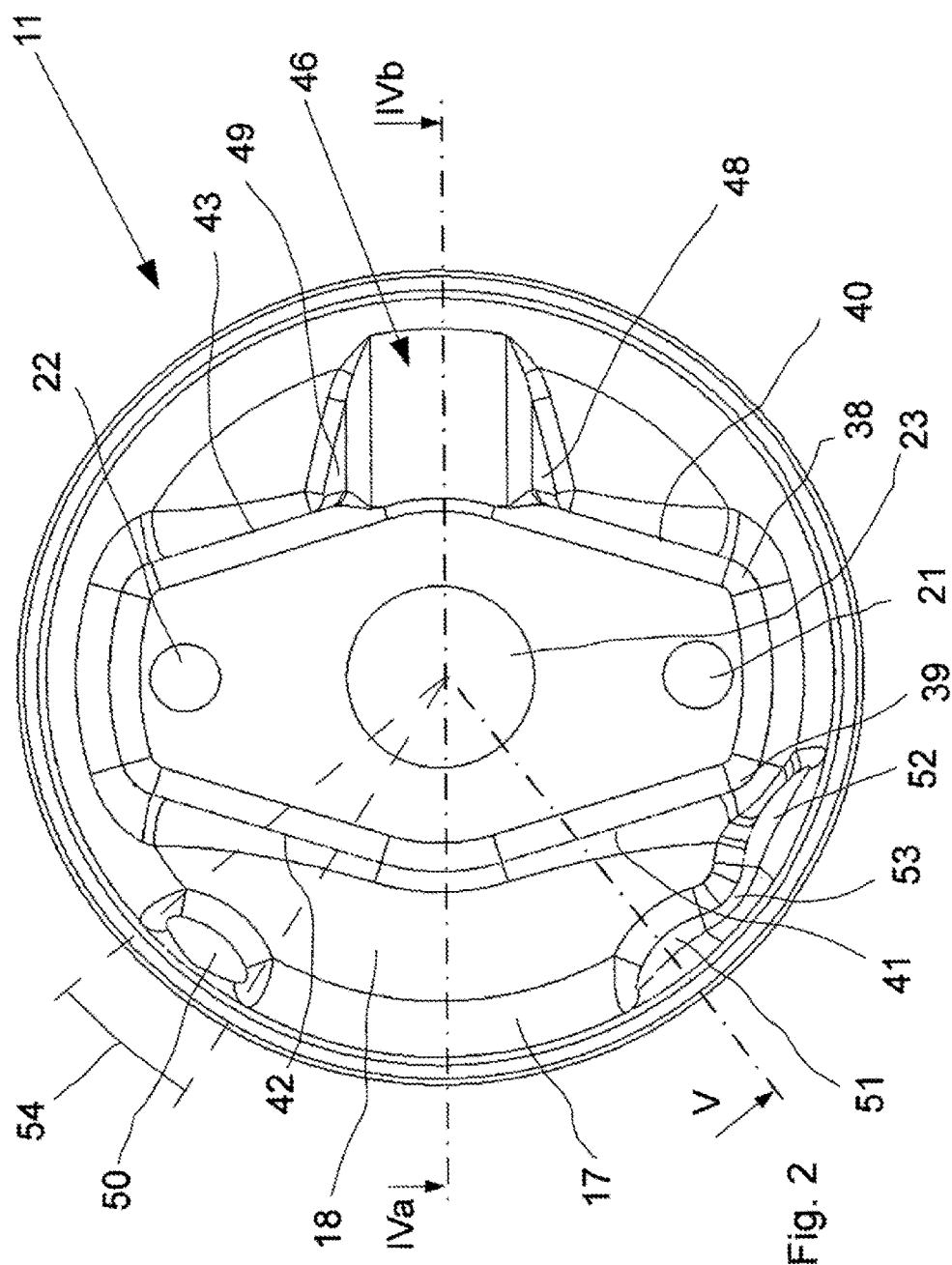
FIG. 2 is a plan view of a front cover of the brake cylinder.
Figure 3:
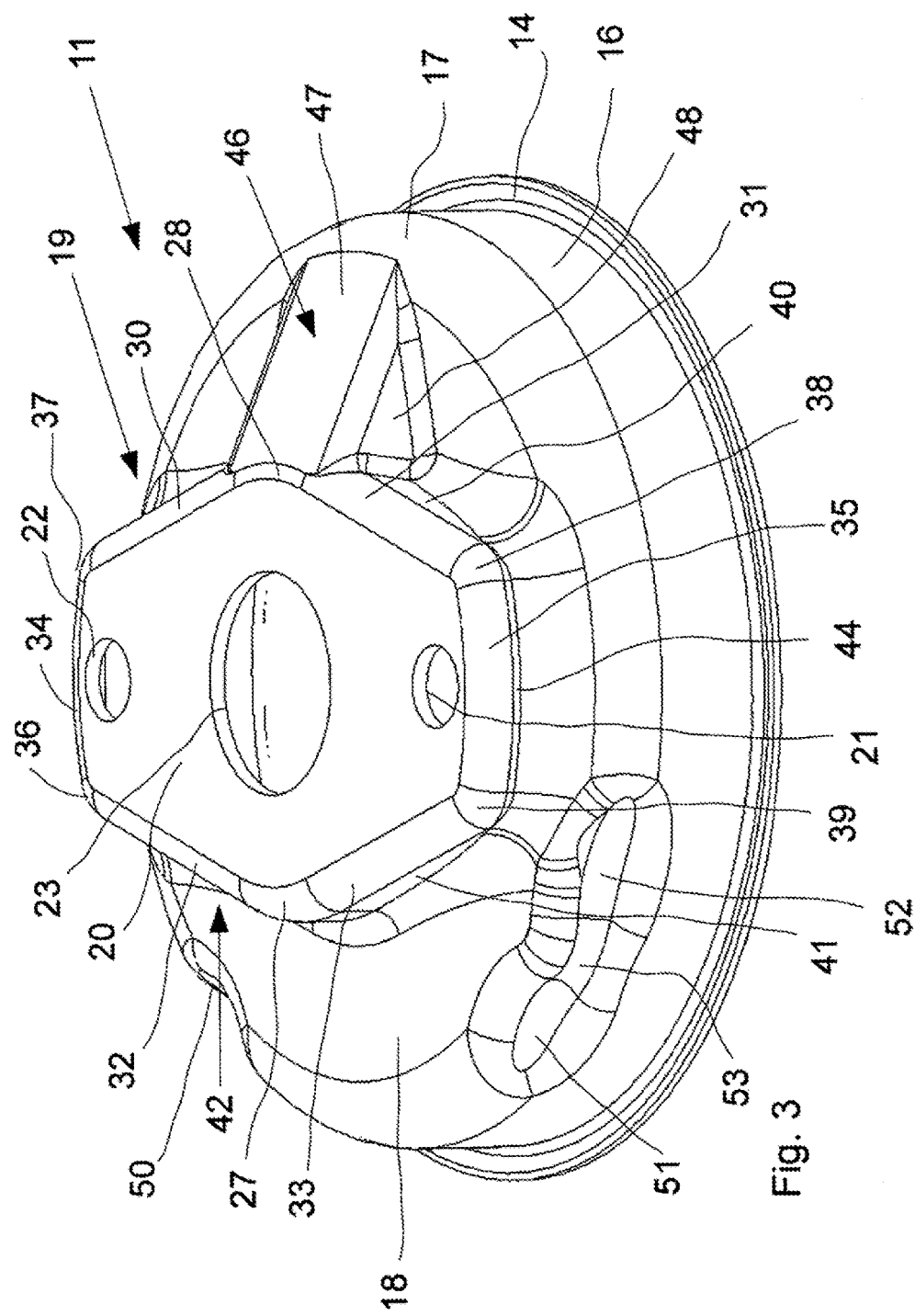
FIG. 3 is a three-dimensional view of the front cover.
Figure 4:
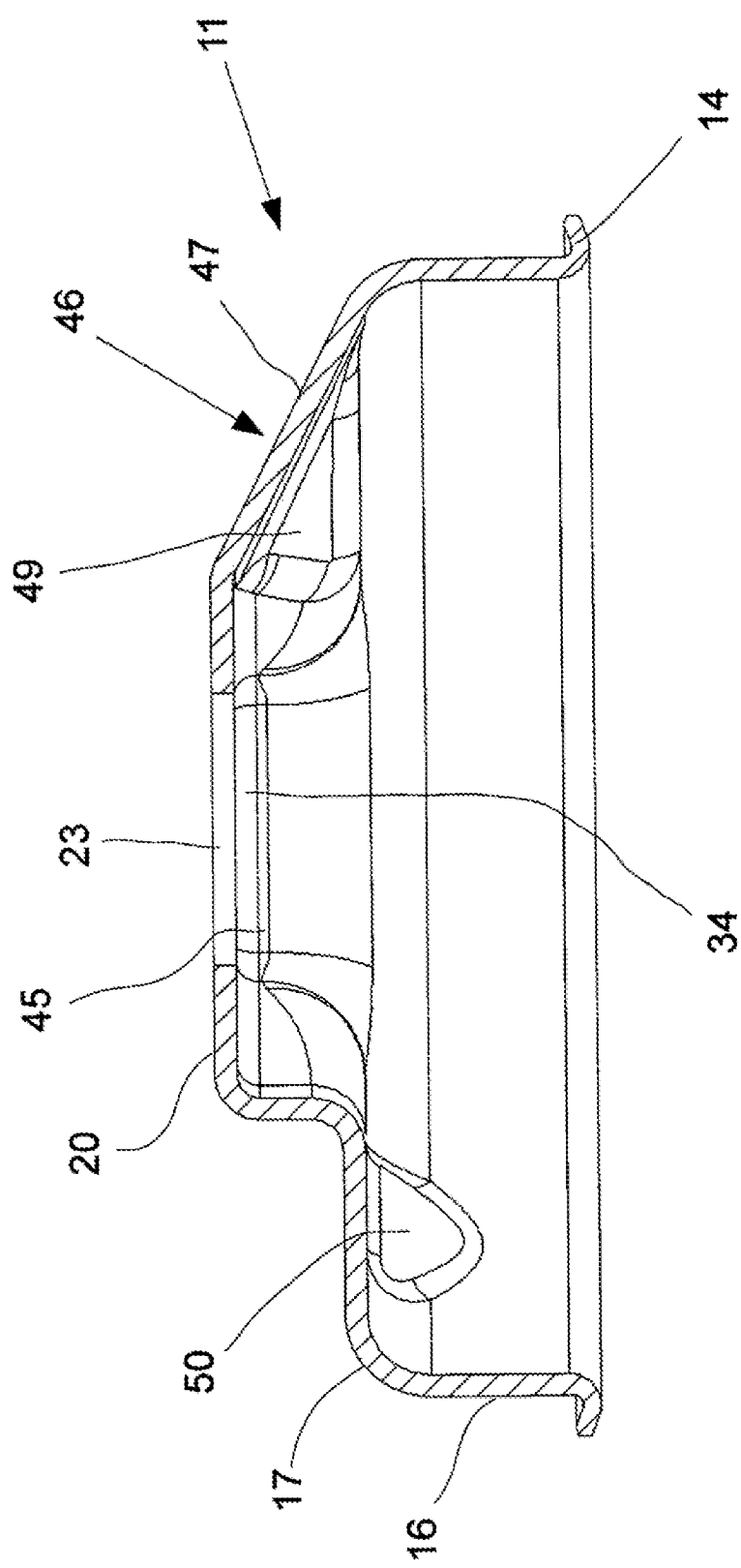
FIG. 4 is a cross-sectional view of the front cover taken along lines IVa-IVb of FIG. 2.
Figure 5:
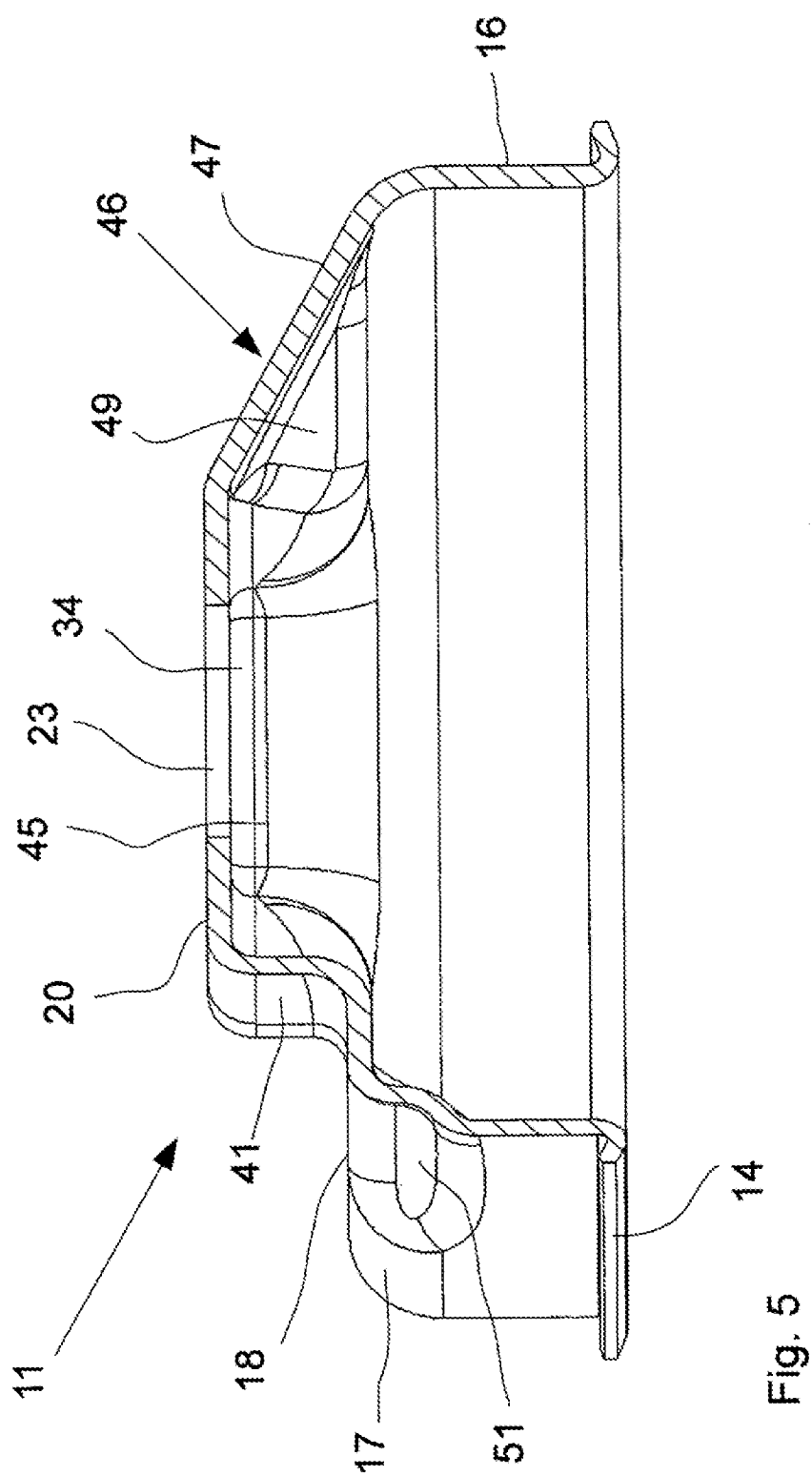
FIG. 5 is a cross-sectional view of the front cover taken along lines V-IVb of FIG. 2.

Without the rib 46 the front cover would have two axes of symmetry. Provided with the rib 46 only one axis of symmetry is left, see line IVa-IVb in FIG. 2. To achieve a more asymmetrical design for a higher stiffness and increased vibration resistance the circumferential edge 17 could be provided with dents 50, 51, 52 or any other dished sections. Particularly FIGS. 2 and 3 show the dent 50 in front of or radially outside of the side wall 42 and the longitudinal edge 32, while the dent 51 is positioned in front of the other side wall 41. The dent 52 is shown in front of the angle 39, the latter adjoining the side wall 41 with longitudinal edge 33.

Dents 51, 52 are close together and even overlap each other. An overlapping portion 53 is situated slightly inwards compared to the surface of the circumferential edge 17 but is looking like a protrusion between the dents 51, 52.

All dents 50 to 52 are on one side of the base wall 18 away from the rib 46. Each dent 50 to 52 extends over an angle 54 of approximately 20° or 25° or 15° to 30°.

Each of the dents 51, 52 is broader than dent 50. The dents 50 to 52 not only increase the asymmetry of front cover but also enable or ease fastening of front cover 11 to different brake calipers (not shown).

While the above description constitutes the preferred embodiments of the present invention, it will be appreciated that the invention is susceptible to modification, variation and change without departing from the proper scope and fair meaning of the accompanying claims.

What is claimed is:

1. A brake cylinder for an air-operated brake, comprising a housing including a front cover (11) having a generally cylindrical lateral surface (16) and a base wall (18) adjoining the lateral surface (16), the base wall (18) having an elevated portion (19) extending diametrically across the base wall with a central bore or middle opening (23) for a cylinder plunger extending in an axial direction and two outer openings (21, 22) on opposite sides of the central bore or middle opening (23), the two outer openings (21, 22) extending parallel to the axial direction, wherein no more than one rib (46) is formed on the front cover (11), the rib (46) extending on the base wall (18) in addition to the elevated portion (19), wherein the elevated portion and the rib are hollow structures that are open on one side of the base wall.

2. The brake cylinder according to claim 1, wherein the rib (46) extends from the elevated portion (19) toward a circumferential edge (17) between the base wall (18) and the lateral surface (16).

3. The brake cylinder according to claim 1, wherein the rib (46) extends from the elevated portion (19) in a radial direction.

4. The brake cylinder according to claim 1, wherein the rib (46) is formed only on one side of the elevated portion (19), wherein the rib (46) extends in a radial direction and ends at an edge of the lateral surface (16) proximate the base wall or at a circumferential edge (17) between the base wall (18) and the lateral surface (16), such that the rib and the elevated portion have only one axis of symmetry that extends along the rib.

5. The brake cylinder according to claim 1, wherein the rib (46) has a width smaller than the elevated portion (19).

6. A pneumatically actuatable disc brake comprising a brake cylinder according to claim 1, with a respective threaded stud or bushing extending through each of the two outer openings (21, 22), wherein the front cover is formed by deep-drawing or thermoforming.

7. The brake cylinder according to claim 1, wherein the rib (46) extends from the elevated portion and tapers down to the base wall (18).

8. The brake cylinder according to claim 7, wherein the rib (46) tapers down to an intersection between the base wall (18) and the lateral surface (16).

\* \* \* \* \*